United States Patent [19]

Putman

[11] 4,247,143

[45] Jan. 27, 1981

[54] PAYLOAD RELEASE MECHANISM

[75] Inventor: Stephen G. Putman, Fort Wayne, Ind.

[73] Assignee: The United States of America as represented by the Secretary of the Navy, Washington, D.C.

[21] Appl. No.: 33,651

[22] Filed: Apr. 26, 1979

[51] Int. Cl.³ ............................................. B64D 17/38
[52] U.S. Cl. .................................................. 294/83 A
[58] Field of Search ............ 294/83 A, 83 AA, 83 R; 244/151 A, 151 B, 137 R, 151 R; 24/230 A, 230 AS, 230 R, 265 R; 9/9

[56] References Cited

U.S. PATENT DOCUMENTS

| | | | |
|---|---|---|---|
| 2,933,340 | 4/1960 | McDiarmid | 294/83 A |
| 3,624,674 | 11/1971 | Gaylord | 24/230 A |

Primary Examiner—James B. Marbert
Attorney, Agent, or Firm—R. S. Sciascia; Henry Hansen

[57] ABSTRACT

A sonobuoy having its component parts packaged within a cylindrical housing suitable for dispensing from an aircraft launcher and automatically deployable to a transponder mode in its descent through the air and water. On launching, a wind flap at one end of the housing opens to pull a lanyard attached to a drag chute retaining bag which is pulled off to release a chute. Upon water immersion, a circuit sensitive thereto energizes the sonobuoy electronics and fires a squib which releases compressed $CO_2$ to extend an inflatable float bag to the outside of the housing. A bag retainer cap applies an outward force to a payload release mechanism jettisoning the chute and permitting the float bag to inflate, erect a flexible antenna therein, rise to the surface, also disengages the housing permitting it and components which are pulled out of the housing therein to descend freely in the water paying out a suspension and signal cable to a desired hydrophone operating depth. A sea anchor folded and stored inside the cable pack is unfolded and a hydrophone suspended at the end of the cable. The payload release mechanism more particularly includes a pair of retainer blocks, secured to the chute risers, extending into slots in the housing. A pair of overlapping, rotatable latch plates between the blocks prevent their release under drag chute loading. The release force for extending the float bag is also applied to rotate latch plates to positions permitting the blocks to disengage from the housing, jettison the drag chute, and release the housing components.

6 Claims, 14 Drawing Figures

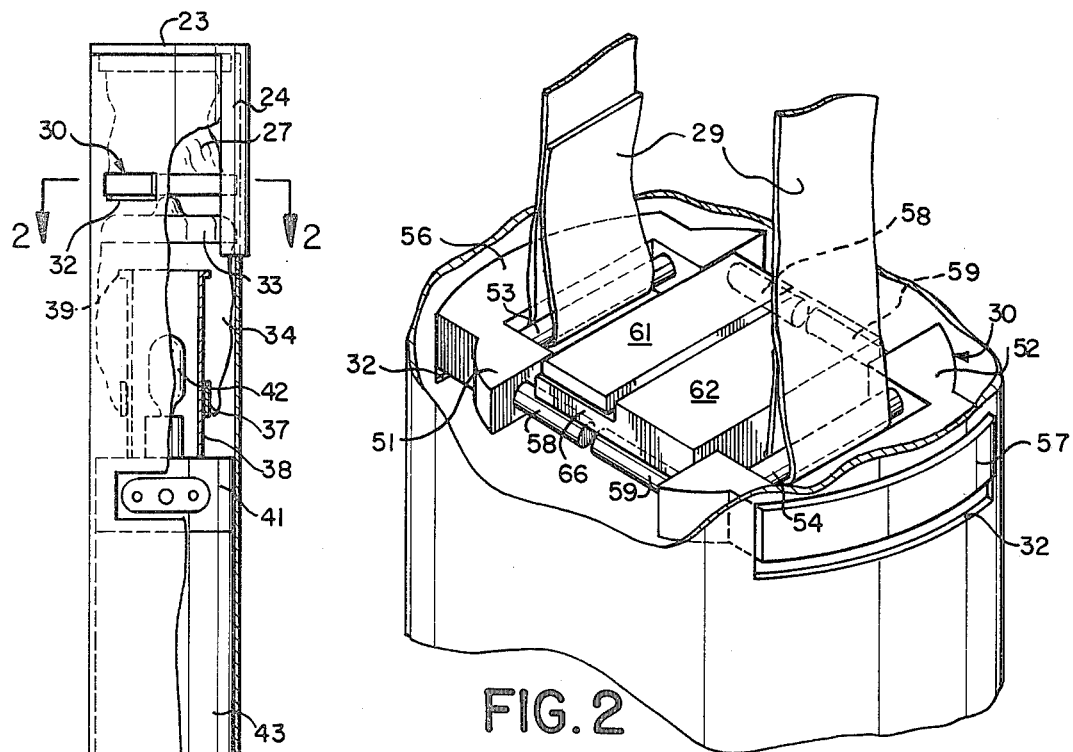
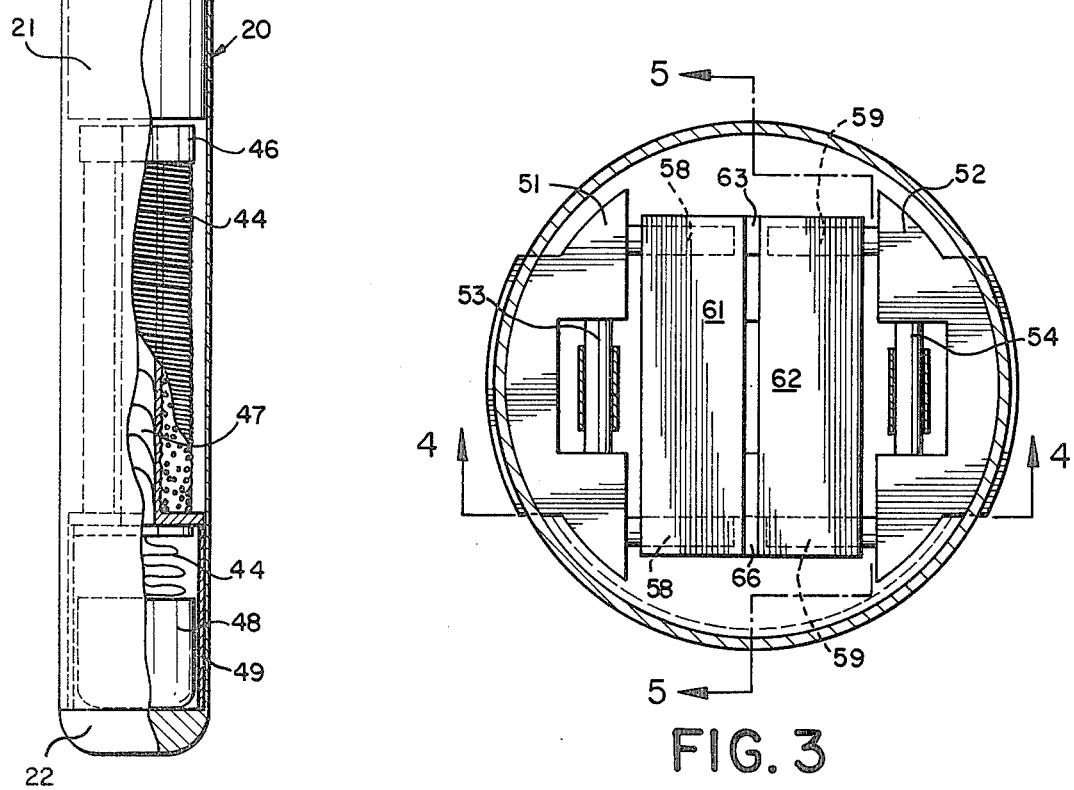
FIG. 1
FIG. 2
FIG. 3

PAYLOAD RELEASE MECHANISM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to sonobuoys, and more particularly to an air-dropped sonobuoy having a quick and reliable means for jettisoning a drag chute deployed in the air, and for releasing component parts contained within the sonobuoy housing for deployment in the water.

In the evolution of air-dropped sonobuoys towards smaller configurations, improved deployment devices are needed to sustain for increase reliability of automatic deployment systems while minimizing costs and space requirements. A typical air-launched sonobuoy deploys a drag chute after ejection from an aircraft launcher to retard and stabilize its descent. Upon reaching the sea, the chute is jettisoned and the sonobuoy further deployed into an operating mode wherein a hydrophone is suspended at a preselected depth from a radio-transmitter supported at the surface by a flotation device. The chute is usually jettisoned by a release mechanism actuated in response to a signal indicative of the sonobuoy's immersion in the water. For example, a water-activated or impact switch triggers a mechanism which jettisons the chute. Prior art release mechanism have been costly, too large or unreliable. Reliability has been particularly problemmatical in release under very high load conditions such as occurs after the sonobuoy enters the water with the open canopy. A sudden and greatly increased drag force is produced just at the time release is desired. Due to these high forces, release mechanisms of the prior art have often failed to function preventing the sonobuoy from complete operational deployment. More sophisticated release mechanisms usually occupy too much of the precious space within the sonobuoy housing.

SUMMARY OF THE INVENTION

Accordingly, a general purpose and object of the present invention is to provide an improved sonobuoy deployment system which is particularly adapted to be dispensed from an aircraft into the water and automatically deployed and conditioned for underwater acoustic operations. Another object of the invention is to provide an improved release mechanism in a sonobuoy for jettisoning a deployed parchute, and for releasing components contained within the sonobuoy for subsequent deployment, upon immersion in the water. A further object of the invention is to provide a quick and reliable mechanism for disconnecting a payload depending from support structure under a loaded condition. Still other objects of the invention are to provide a release mechanism for a sonobuoy which occupies relatively little space along the length of the sonobuoy housing, to provide a release mechanism in which the required release force varies directly with load, and to provide a release mechanism which is relatively simple in construction, easy to manufacture and install, and which utilizes duplicate parts for reducing costs.

Briefly, these and other objects of the invention are accomplished by a pair of opposed coplanar blocks respectively depending from supporting risers or straps. The blocks include outwardly extending tab portions for registering with slots in a payload structure. Each block also includes a pair of parallel hinge pins extending toward corresponding pins of the other block on the same axes. A pair of adjacent latches pivotally connected about respective coaxial hinge pins interlock the blocks preventing them from camming out of the slots under load. A release force applied to the latches causes them to rotate in opposite directions about the hinge pins until the latter are free to rotate upward under the force applied at the risers. The blocks are thus withdrawn from the payload structure for release of the payload.

The foregoing and other objects and many of the attendant advantages of the present invention will be readily appreciated as the same become better understood by reference to the following detailed description when considered with the accompanying drawings, wherein:

FIG. 1 represents a longitudinal section of an air-dropped sonobuoy according to the invention assembled for launching from an aircraft;

FIG. 2 is an isometric view along the line 2—2 of FIG. 1 of a payload release mechanism according to the invention as applied to the sonobuoy of FIG. 1 with its drag chute risers extended;

FIG. 3 represents a plan view along the line 2—2 of FIG. 1 of the release mechanism;

Figure 14:
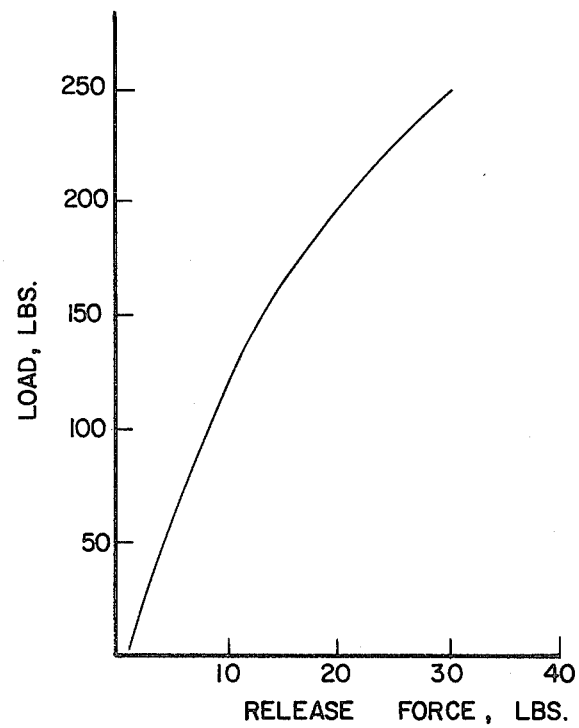

FIGS. 8-13 pictorially illustrate the deployment sequence of the sonobuoy of FIG. 1 from air launching to final deployment in the water; and FIG. 14 is a graph of typical values of load force versus release force as applied to the release mechanism of FIGS. 2-7.

Referring now to the drawings, wherein like reference characters designate like or corresponsing parts throughout the several views, there is illustrated in FIG. 1 a complete sonobuoy 20 assembled for insertion in an aircraft launcher. Sonobuoy 20 includes a cylindrical, aluminum outer housing 21 closed at a so-called lower end by a weighted end wall 22 fixed thereto. The other end, or so-called upper end, of housing 20 is closed by a removable cap 23 which includes a vain or windflap 24 extending downwardly along the side of housing 21. Cap 23 may be held in place by friction so that when the sonobuoy 20 is ejected with the windflap 24 first, the wind force acting on the inside surface of windflap 24 is sufficient to blow cap 23 off of the upper end.

A short lanyard 26 (FIG. 8) is attached at one end to cap 23, and the other end is attached to a drag chute retaining bag 27. A drag chute 28 (FIG. 8) enclosed in bag 27 when deployed reduces the rate of descent and allows precise patterns of sonobuoy deployment into the sea. In a manner disclosed herein, a pair of risers 29 attached at one end to the shroud lines of drag chute 28 are secured at the other ends to a payload release mechanism 30 which releasably transfers the drag force to housing 21 through the upper edges of a pair of diametrically opposed slots 32 formed in housing 21.

A release force is applied to mechanism 30 by a boss on the upper surface of a float retainer cap 33 which also removably encloses the upper portion of a deflated and folded float bag 34. A flexible antenna 36 (FIG. 13) secured along the inside surface of the bag is erected when bag 34 is inflated. The lower end of bag 34 is secured about a collar 37 which is sealingly slidable on a tube 38 for a distance sufficient to allow bag 34 to extend out of the upper end of housing 21. A flange 39 on the end of tube 38 limits the collar travel. A water-activated squib 41 at the base of tube 38 causes a $CO_2$ cartridge 42 to pierce and provide a gas pressure into tube 38. The release force against the lower surface of retainer cup 33 is thereby developed.

An electronics and battery pack 43 slidable in housing 21 is attached to the lower surface of squib 41. Pack 43 is electrically and mechanically connected to one end of a suspension and signal cable 44 which wound about a hollow mandril 46 in a manner suitable for pay out. The other end is mechanically connected to as flexible sea anchor 47 rolled up and stored inside mandril 46, and unfoldable to an operating mode (FIG. 13) when deployed in the sea. Cable 47 extends for a predetermined length beyond sea anchor 47 and electrically and mechanically terminates at a hydrophone 48. A spacer tube 49 is releasably retained between the lower end of mandril 46 and end wall 22, and is slidable between housing 21 and hydrophone 48. Hydrophone 49 and electronics and battery pack 43, in combination, detect and amplify underwater sounds which are modulated and transmitted through antenna 36 to an associated remote receiver (not shown).

Referring now to the details of the payload release mechanism 30 shown in FIGS. 2–6, two opposed coplanar retainer blocks 51 and 52 interconnect, and transfer load from, risers 29 to cylinder 21 through load pins 53 and 54 of blocks 51 and 52, respectively. Tabs 56 and 57 extending in opposite directions from blocks 51 and 52 register with and engage slots 32 and bear against the upper edges thereof under a load. Blocks 51 and 52 also include respective pairs of hinge pins 58 and 59. Each hinge pin 58 extends inwardly and coaxially with a correspondingly extended hinge pin 59 to form two parallel and coplanar hinge axes between blocks 51 and 52. The axes form the pivot points for a pair of coplanar and parallel latch plates 61 and 62. Plate 61 includes a lateral member 63 at one end having a groove 64 for receiving one pair of coaxial hinge pins 58 and 59. Plate 62 similarly includes a lateral member 66 and groove 67 for receiving the other pair of coaxial hinge pins 58 and 59. The free ends of latch plates 61 and 62 each overlap and abut lateral members 66 and 63, respectively. Thus, the coupling forces in blocks 51 and 52 imparted between the load pins 53 and 54 and the tabs 56 and 57, are resisted by hinge pins 58 and 59 while latch plates 61 and 62 remain coplanar.

Figure 4:
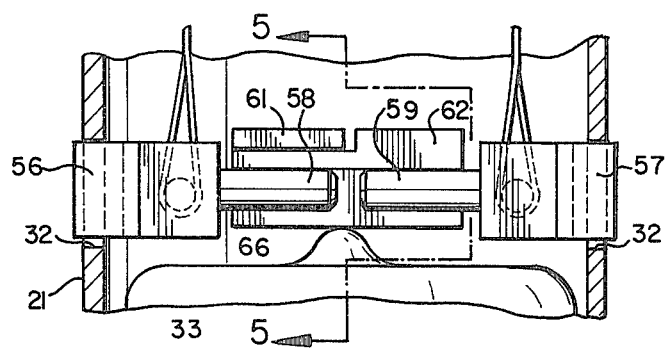
FIG. 4 is a side view, partially in cross-section, of the release mechanism taken along the line 4—4 of FIG. 3.
Figure 5:
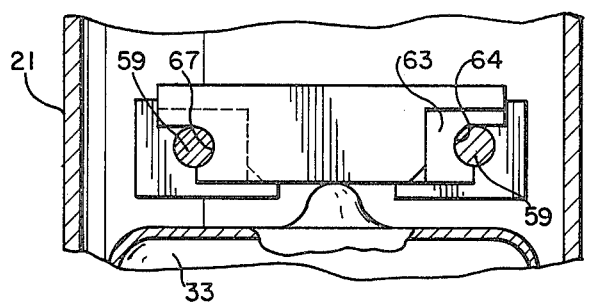
FIG. 5 is a side view, partially in cross-section, of the release mechanism taken along the line 5—5 of FIG. 3.
Figure 7:
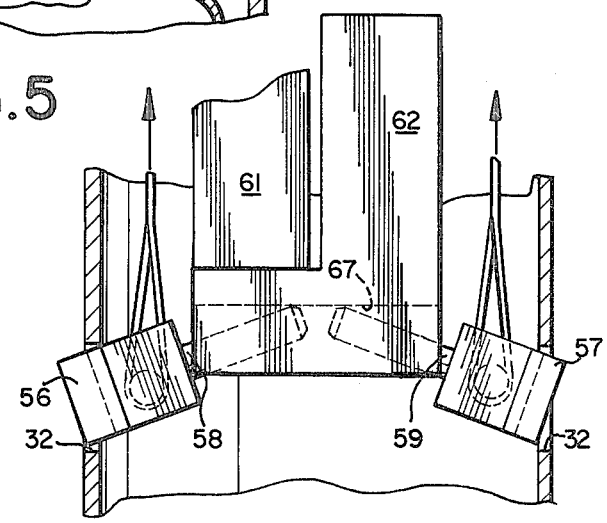
FIG. 7 illustrates operation of the release mechanism as shown in FIG. 4 upon disengagement of the latches.
Figure 6:
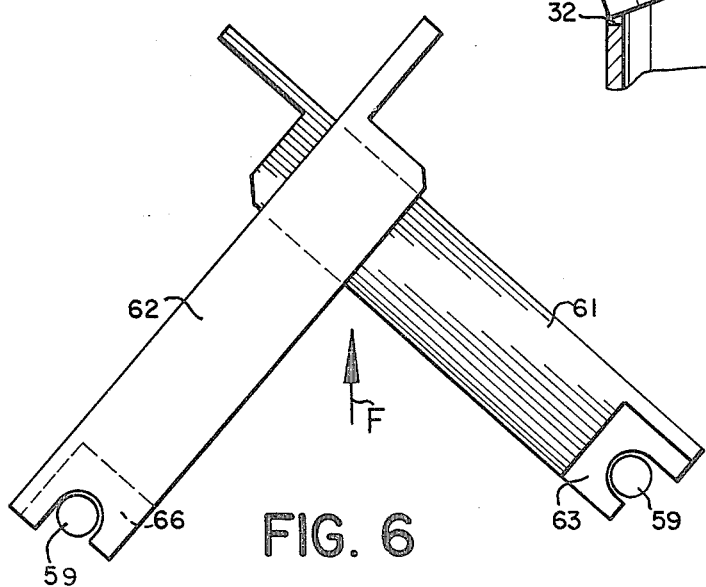
FIG. 6 illustrates operation of the release mechanism as shown in FIG. 5 upon application of a release force, to latches therein.
Figure 8:
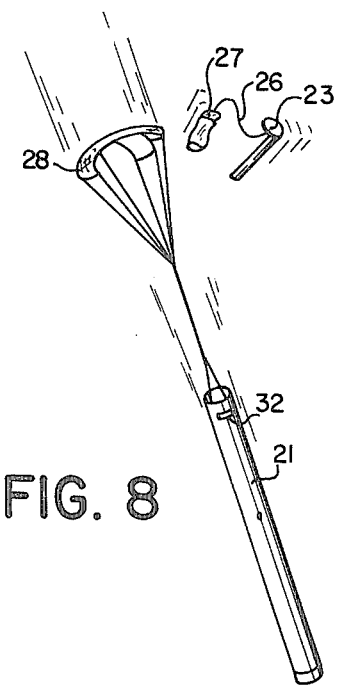
Figure 9:
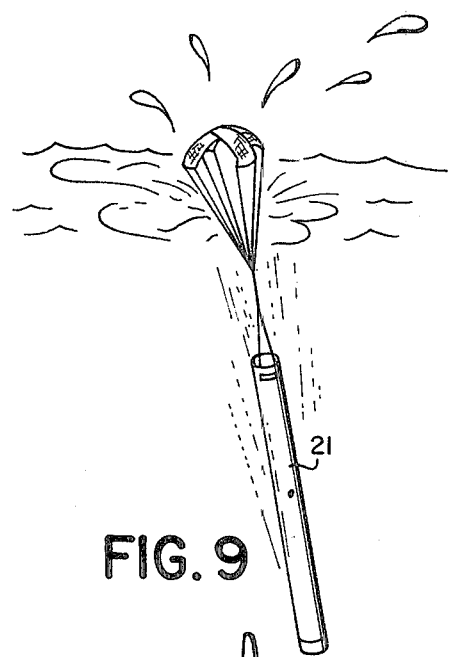
Figure 10:
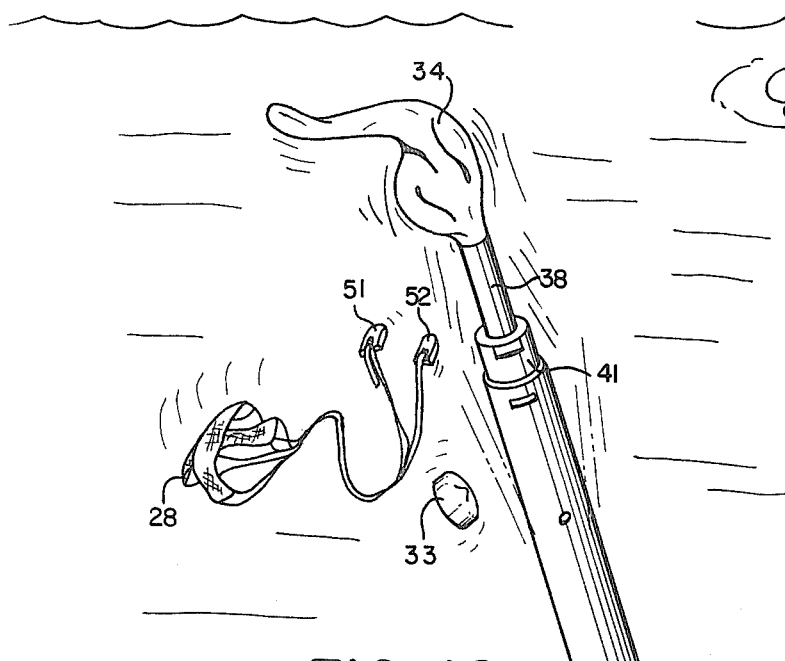
Figure 11:
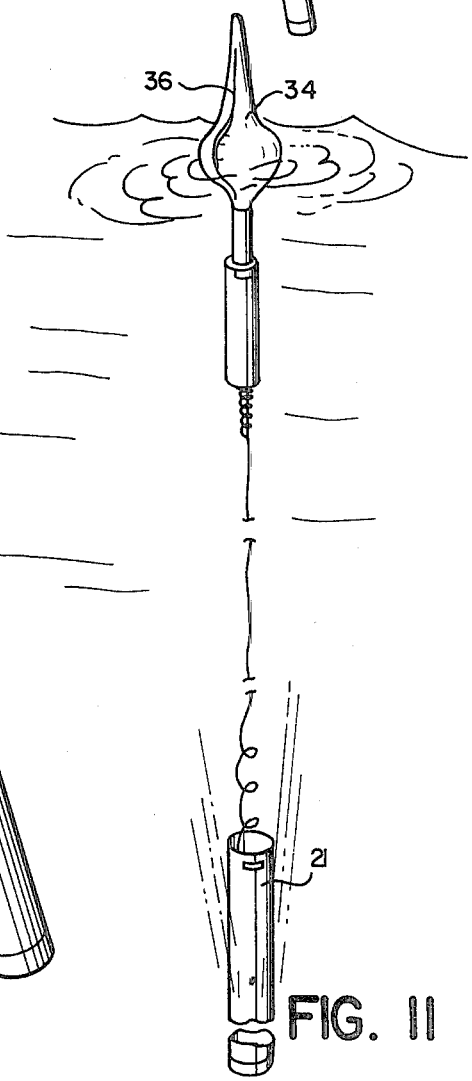
Figure 12:
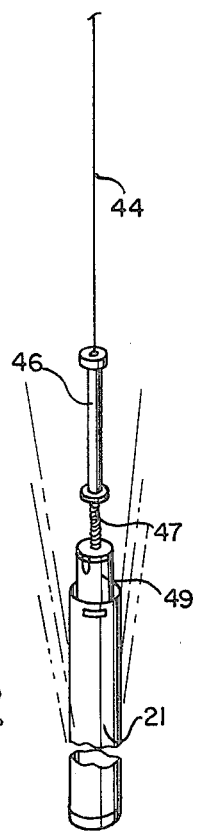
Figure 13:
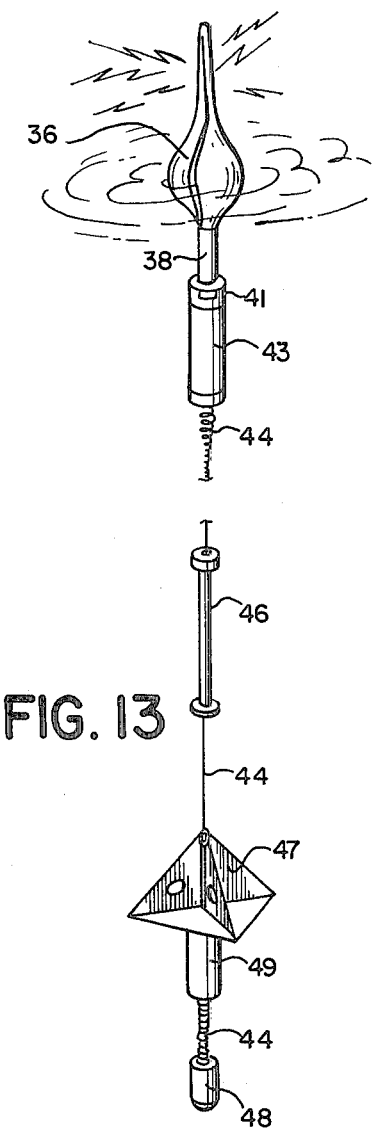

FIGS. 6 and 7 illustrate the altered relationship of the parts after a release force F has been applied to latch plates 61 and 62 in the area between the axes of the opposed hinge pins under load conditions. The latch plates 61 and 62 rotate in opposite directions about the hinge pins 58 and 59 to where they no longer absorb the coupling forces in blocks 51 and 52. At this point, latch plates 61 and 62 are ejected by the blocks as they, in turn, cam out of slots 32. Typical release forces required for various pay loads are shown in FIG. 14.

The mechanical operation of the various parts of the sonobuoy from launch to operation in the water is summarized as follows. Sonobuoy 20 is ejected from an aircraft launch tube of conventional design with the wind cap 23 entering the air stream first. The windflap 24 opens and pulls the drag chute retaining bag 27 off of the folded drag chute 28 allowing it to open and stabilize the sonobuoy's descent in the air. During descent, the tension in drag chute risers 29 (FIG. 2) is opposed, through retainer blocks 51 and 52, by the upper edge of housing slots 32. Blocks 51 and 52, are prevented from rotation out of slots 32 by the retention of hinge pins 58 and 59 in the grooves 64 and 67 in latch plates 61 and 62. On contact with seawater, a sensing circuit in squib 41 releases compressed gas in $CO_2$ cartridge 42 and energizes electronics and battery pack 43. The gas is ported into tube 38 forcing folded float bag 34 and float retainer cap 33 outwardly against latch plates 61 and 62. The force of retainer cap 33 causes plates 61 and 62 to rotate in grooves 64 and 67 about hinge pins 58 and 59 to the vertical position (FIG. 7) so that hinge pins 58 and 59 are free to allow blocks 51 and 52 to cam out of slots 32 and jettison the drag chute and release mechanism. It should be noted that since the drag chute does not jettison until after the sonobuoy is in the water, the drag force of the chute in the water is substantially increased. Continued exertion of gas pressure forces float bag 34 outside of housing 21 where it inflates, erects antenna 36, and causes the sonobuoy to rise to the surface. Housing 21 and components below the relase mechanism 30 freely descend in the water as a suspension and signal cable pays out to a desired hydrophone operating depth. At the end of cable payout, housing 21 continues to descend while the lower components are pulled out. Sea anchor 47, folded and stored inside the mandral 46, is released along with hydrophone 48 to complete deployment for electronic operation such as detecting and processing audio signals for transmission to a remote receiver.

Some of the many advantages and improvements in the invention as applied to sonobuoys should now be readily apparent. For example, an improved sonobuoy deployment system is provided which is particularly adapted for dispensing from an aircraft into the water, and for automatically deploying and conditioning it for underwater acoustic operations. A payload release mechanism is provided which will quickly and reliably release the drag chute of a sonobuoy under high load conditions encountered during deceleration after immersion in the water. The release mechanism occupies relatively little space along the length of the sonobuoy housing, is relatively simple design and construction, is easy to manufacture and install, and utilizes duplicate parts for cost savings.

It should be understood of course, that the foregoing disclosure relates only to a preferred embodiment of the invention, and that numerous modifications and variations may be made therein without departing from the spirit and scope of the invention as set forth in the appended claims.

What is claimed is:
1. A load release mechanism comprising:
a pair of opposed coplanar retainer means in a plane normal to the direction of a load, each of said pair including a hinge means in said plane extending toward the other retainer means, a tab in said plane extending from the distal surface of said retainer means formed to engage the load, the attachment means between said hinge means and said tab formed to be attached to a support means;

latch means in said plane coupled to said hinge means for maintaining said retainer means coplanar under the load and for releasing said hinge means when a release force is applied thereto;

whereby said pair of retainer means are free to disengage from said load.

2. A load release mechanism according to claim 1 wherein:

each of said hinge means includes a pair of parallel pins coaxial with respective pins of the other of said hinge means.

3. A load release mechanism according to claim 2 wherein:

said latch means includes a pair of coplanar parallel plates each having a groove at the opposite end of respective other of said plates and formed to pivot about the coaxial pins of said hinge means.

4. In an air launched sonobuoy having a drag chute with risers, a cylindrical housing containing deployable components, and force means activated upon immersion in water, the improvement comprising:

a pair of opposed coplanar retainer means within said housing and in a plane normal to the cylindrical axis thereof, each said pair including hinge means in said plane extending toward the other retainer means, a tab in said plane extending from the distal surface of said retainer means formed to engage the sides of said housing, and attachment means therebetween formed to be attached to said risers;

latch means in said plane coupled to said hinge means for maintaining said retainer means coplanar under load, and for releasing said hinge means when said force means is activated;

whereby said pair of retainer means are free to disengage the drag chute from the housing and deploy the components therein.

5. The improvement according to claim 4 wherein:

each of said hinge means includes a pair of parallel pins coaxial with respective pins of the other of said hinge means.

6. The improvement according to claim 5 wherein:

said latch means includes a pair of coplanar parallel plates each having groove at the opposite end of respective other of said plates and formed to pivot about the coaxial pins of said hinge means.

* * * * *